Dec. 19, 1950     C. KATZEN ET AL     2,534,604
PHOTO FILM PROCESSING APPARATUS
Filed Nov. 30, 1948     3 Sheets-Sheet 1

Inventors
Cyrus Katzen
and Thomas R. Games,
By Homer R. Montague
ATTORNEY

Dec. 19, 1950     C. KATZEN ET AL     2,534,604
PHOTO FILM PROCESSING APPARATUS
Filed Nov. 30, 1948     3 Sheets-Sheet 2

Inventors
Cyrus Katzen
and Thomas R. Games,

By Homer R. Montague

ATTORNEY

Patented Dec. 19, 1950

2,534,604

UNITED STATES PATENT OFFICE 2,534,604

PHOTO FILM PROCESSING APPARATUS

Cyrus Katzen and Thomas R. Games,
Washington, D. C.

Application November 30, 1948, Serial No. 62,704

2 Claims. (Cl. 95—89)

This invention deals with photographic fluid treating apparatus, and has for its principal object to provide a mechanism by which photographic films, plates or the like, and especially medical and dental X-ray films and plates, may be subjected to a predetermined sequence of fluid treating baths to develop, fix and wash the same under standard or controlled conditions.

The invention is an improvement, in certain respects, upon the photographic fluid treating machines disclosed in our prior applications Serial No. 746,176 filed May 6, 1947, and Serial No. 52,184 filed Oct. 1, 1948, but aims to provide a mechanism which can be produced and sold at a greatly reduced cost as compared with the machines of those prior cases, and which can be installed in considerably less space.

A further object of the invention is to provide a machine which follows the principles of the prior inventions referred to in that the sequence of steps is accomplished by moving the solutions themselves, rather than the films or plates, to a relatively fixed treating location; however, in the present application, the solutions are moved in bulk rather than as liquids via conduits, such movement being permitted by arranging for a lateral (herein vertical) movement of the film rack or support out of the path of the moving solutions in their tanks to permit the changing of location of the solutions in the manner set forth.

Still another object of the invention is to provide a machine which, while fully automatic in operation, requires a substantially smaller number of controls and similar components than do the arrangements of our prior applications; for example, no magnetic valves or the like need be used, since the solutions are not passed through pipes or tubes but are moved in bulk.

Figure 1:
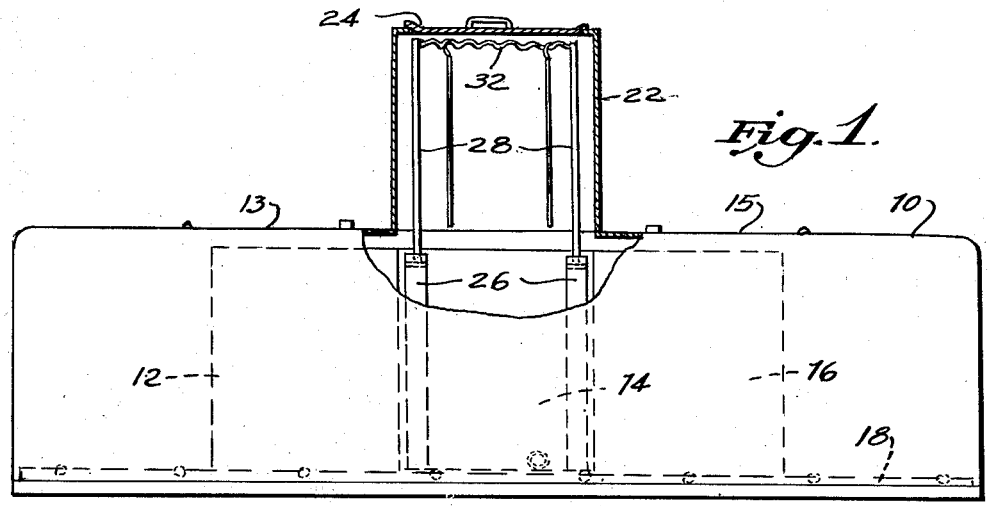
Figure 2:
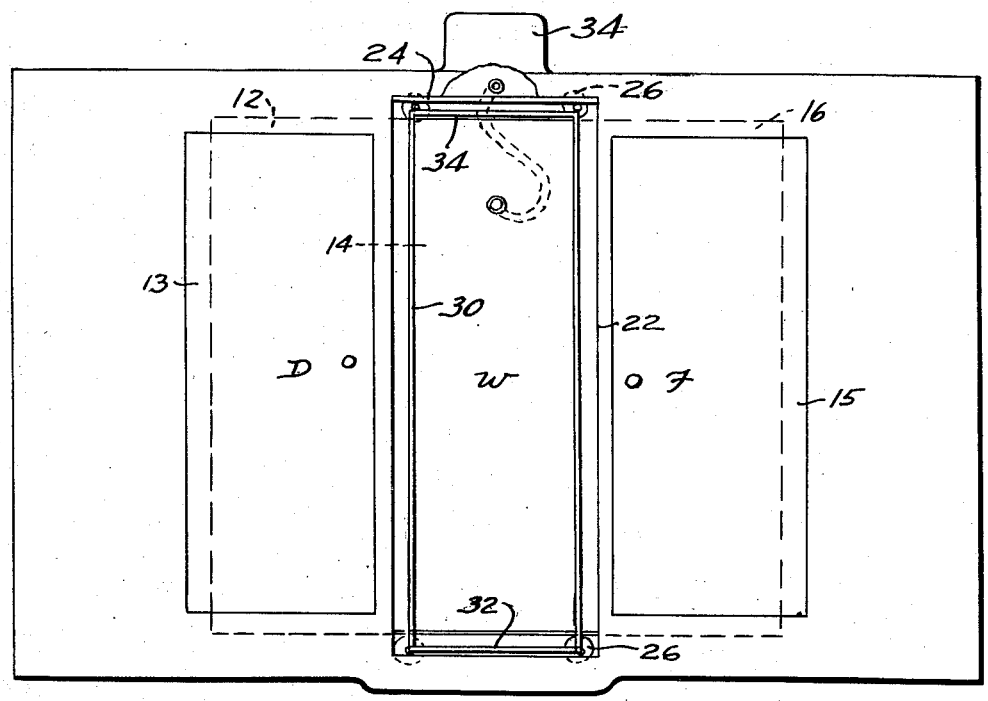
Figure 3:
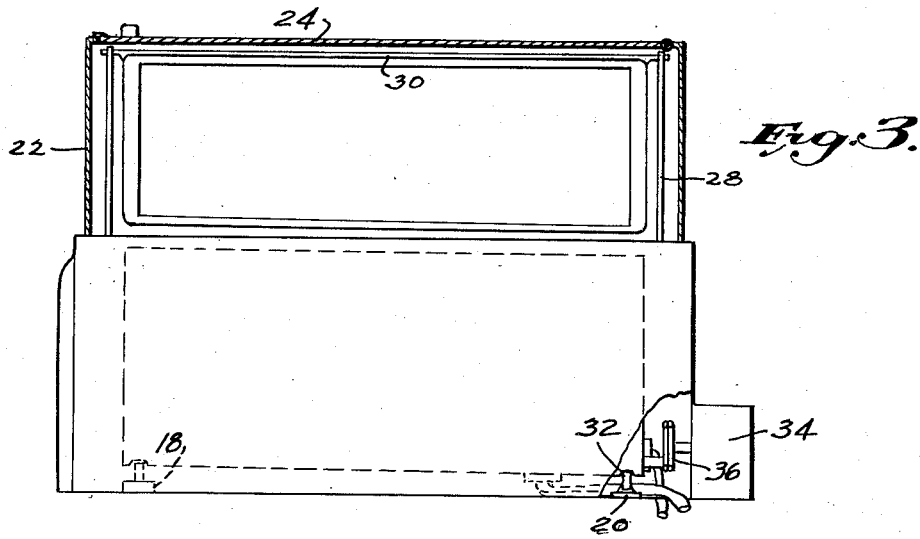
Figure 4:
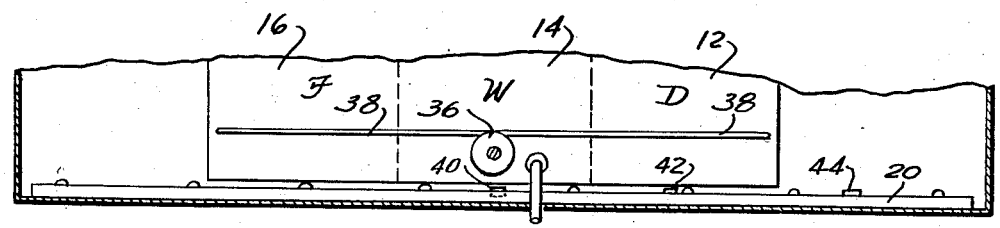
Figure 5:
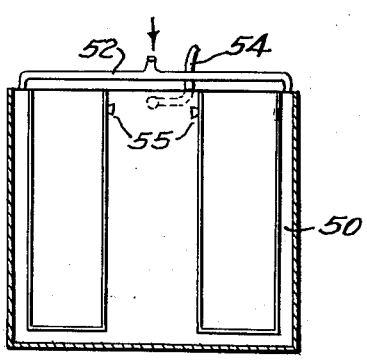
Figure 6:
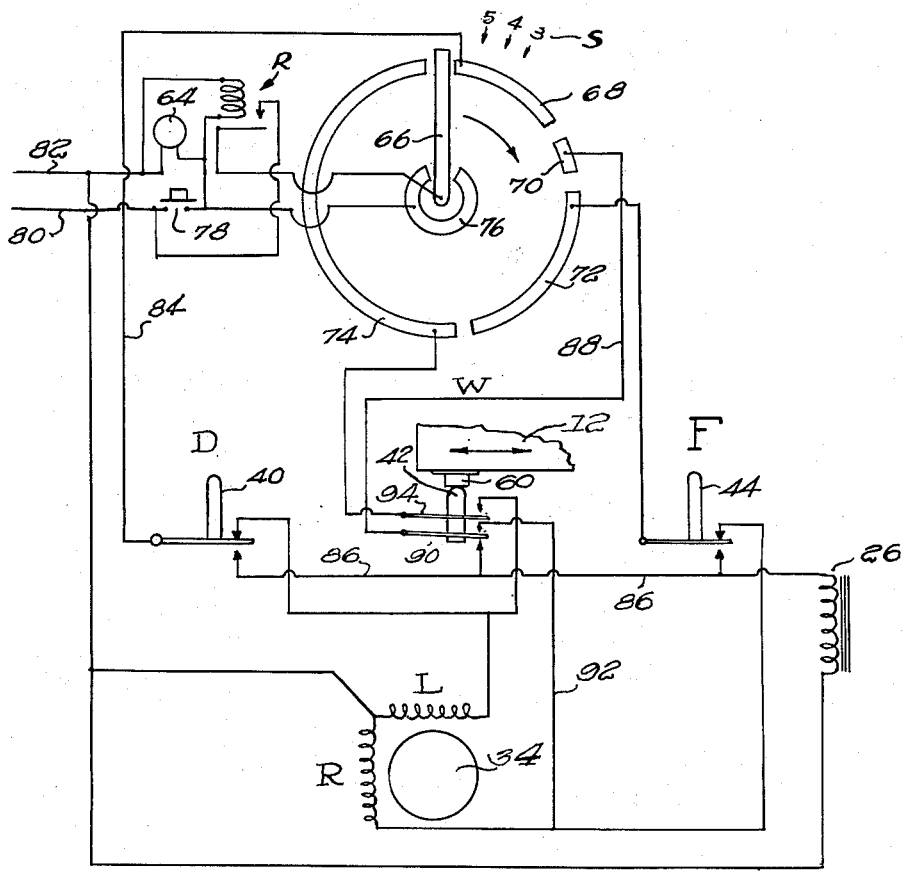

The above and other objects and advantages of the invention will best be understood by referring to the following detailed specification of a preferred embodiment thereof, taken in connection with the appended drawings, in which:

Fig. 1 is a front elevation, with parts broken away, of a first embodiment thereof, Fig. 2 is a plan view of the same, partly broken away, and with the lid or cover in open position, Fig. 3 is a side view, partly in section, of the same form of the device, Fig. 4 is a partial rear view with the back plate removed or broken away to illustrate the guiding and driving means for the moving tanks, Fig. 5 is a horizontal sectional view of a modified arrangement of a tank array adapted to be moved within the main housing of the machine, and Fig. 6 is a schematic wiring diagram of the controls for the apparatus.

Referring now to Fig. 1 of the drawings, there is shown a developing machine comprising a relatively stationary housing 10 within which is reciprocably mounted an array of tanks, herein shown for example as three tanks 12, 14 and 16, these tanks desirably being fabricated as a unit, or alternatively secured to one another so that they move as a unit along a pair of tracks or rails 18, 20 (see also Figs. 2 and 3). Housing 10 is provided with access doors 13 and 15 to enable the tanks to be cleaned and filled with the appropriate solutions for developing and fixing.

Centrally of housing 10 there is provided an upwardly extending casing portion 22 provided with a hinged lid or cover 24, this portion 22 being arranged to receive the film or plate carrier mechanism when in its elevated position as in Fig. 1. As here shown by way of example, the raising and lowering of the film carriers is accomplished by a group of four electric solenoids, arranged at each corner of the upward casing extension 22, and outside the walls of the triple tank assembly, said solenoids being designated by numeral 26 and each provided with a plunger 28 normally biassed to upward or raised position as by a spring coiled below the plunger within the corresponding solenoid. A rack 30 is arranged to connect the upper ends of the respective solenoid plungers, and is provided with serrated or notched front and rear legs 32, 34 to receive the extremities of the film or plate holders, as best shown in Fig. 3. It is obvious that when the four solenoids 26 are energized, they will retract the plungers against the pressure of the springs and cause the film holding rack 30 to be pulled down into a position in which the films are beneath the level of liquid in whichever tank is located beneath the casing portion 22, and when the solenoids are deenergized, the springs will operate to raise the film holders upwardly into the casing part 22, in which position of the films they will be out of the way of the moving tanks, which may then be indexed sidewise to bring the next desired tank into operative relationship with the films or plates.

Other elevating mechanisms, such as pneumatic or hydraulic pistons, motor driven rack and pinion gear, or the like, may obviously be substituted for the solenoids.

The left-hand tank 12 may desirably contain a quantity of developer solution, while the central tank 14 contains wash water, and the right hand tank 16 contains the fixer solutions. Thus, with the parts in their Fig. 1 position, with the central tank 14 beneath casing part 22, the films or plates will be pulled down into the wash water upon the energization of the solenoids, and removed therefrom when the solenoids are disconnected from the circuit.

The manner in which the series of tanks may be conveniently and reliably indexed to their desired and successive positions will be described in connection with Figs. 4 and 6. Fig. 4 is a rear view of a portion of the casing 10 with its back wall broken away to show the rear track or rail 20 and the anti-friction rollers 32, upon which the tank assembly is allowed to roll under the impetus of force applied from a motor 34 (Figs. 2 and 3) through a pulley wheel 36 about which is reaved a cord or the like 38 having its ends connected to extremities of the tank assembly as clearly shown in Fig. 4. When the pulley 36 is rotated in one direction or the other, the tank assembly is correspondingly shifted to the right or left. A series of three limit or position-controlling switches 40, 42 and 44 are positioned along the path of the tank assembly and each has one set of its contacts in series with either the right- or left-hand turning winding of the motor 34. The manner in which the motor, switches and a timer mechanism operate to position the tanks in their successive positions to carry the films through a predetermined cycle will be described in detail in connection with Fig. 6.

Fig. 5 of the drawings shows a modified form of tank assembly in which a water jacket 50 is provided for the control of the temperatures of the tanks and their solutions, the jacket being supplied with circulating water from a manifold 52 which also supplies the wash water required in the central tank. It is to be understood that the solutions contained in the developer and fixer tanks are retained therein normally until exhausted, but the wash water may be allowed to circulate continually, or may be selectively controlled by magnetic valves in accordance with the teachings of our prior applications above referred to. The drain lines as indicated schematically by numeral 54 are preferably formed of flexible hose material, such as rubber or the like, and are of sufficient length to enable the entire movable tank assembly to assume its desired positions without interference from such lines. In order to provide for draining the developer and fixer tanks, they may be provided with petcocks or the like communicating with the drain line for the wash tank, or the inter-tank walls may be apertured so as to enable the developer and fixer solutions to flow into the central or washing tank upon removal of stoppers (indicated by numeral 55 in Fig. 5) from such apertures. The wash water from city mains, for example, may be continuously admitted to the tank 14 and allowed to flow therefrom via an overflow pipe of known construction, arranged for removal to permit complete emptying of the washing tank for transportation, cleaning or similar purposes.

As indicated in Fig. 6, one of the three movable tanks, herein the developer tank 12, is provided with a switch-operating protuberance or cam 60 adapted to control the operation of the three switches 40, 42 and 44. Also in that figure, numeral 34 designates the reversible motor whose two windings L and R are selectively energized to drive the pulley 36 suitably driven from the motor by reduction gearing or the like. A timer which may be of the same general type as shown in our prior applications, comprises a suitable timer motor 64 having a contact arm 66 which is slowly rotated over a series of contact bars 68, 70, 72 and 74, making for example one revolution in thirty minutes, or such other time as is required for a complete cycle of film treatment. Timer arm 66 is shown in Fig. 6 as occupying the position corresponding to the completion of a cycle of operations, in which position it is out of contact with a ring 76 which with arm 66 is connected across the terminals of the "start" button 78 through the normally open contact of a relay R. Upon operation of button 78, current passes from line 80 of the electric supply to the coil of relay R and timer motor 64 and thence to the opposite line 82, starting the timer; also, the relay contacts close to maintain the motor circuit for a complete revolution, or at least until the arm 66 again passes off of ring 76.

The treatment tanks at the time of initiation are in a position in which the central tank 14 (wash water) is positioned beneath the loading hatch cover 24, and of course a batch of undeveloped films have been loaded onto rack 30. As soon as timer arm 66 has contacted the segment 68 of the timer, a circuit is completed via lead 84, the leaf of switch 40 and its upper fixed contact to the L winding of motor 34, thus shifting the tank assembly to the left until switch 40 is operated by the cam 60, thus opening the circuit to the upper contact of switch 40 and stopping the motor 34. At the same time, the circuit is completed to the lower fixed contact of switch 40, which completes a circuit via lead 86 to the solenoids 26, causing the film rack 30 to be drawn down to place the films in the developer solution contained in tank 12, where they remain for a predetermined time controlled by the length of time required for the timer arm 66 to pass off of the segment 68 of the timer. When this occurs, the solenoid circuit is interrupted, and the rack 30 rises to lift the films out of the developer.

As soon as timer arm 66 proceeds to the next segment 70 of the timer, a circuit is completed via lead 88 to the lower leaf 90 of switch 42 (which is now of course in raised position since cam 60 is over switch 40 and not over switch 42), and thence via lead 92 to the "right" winding R of motor 34, which causes the motor 34 to drive the tank assembly to the right a distance equal to the center-to-center separation of adjacent treatment tanks, or until cam 60 again depresses switch 42. This occurs when the central tank 14 is beneath the (raised) film rack 30, and the reclosure of switch 42 completes a circuit through its lower fixed contact to lead 86 and energizes the solenoids 26 to cause the film holder rack to dip the films into the washing tank for purposes of rinsing the films of developer retained thereon from tank 12. When timer arm 66 passes off of the relatively short segment 70, the solenoids 26 are deenergized to raise the film rack permitting the films to drain into the wash tank.

Timer arm 66 now proceeds to make contact with segment 72, completing a circuit through the upper contact of switch 44 to again energize the motor 34 through its R winding, driving the tank assembly another step to the right, until cam 60 operates switch 44, opening the motor circuit with the fixer tank 16 beneath the film rack 30, and closing through its lower contact a circuit to the solenoids 26 to cause the rack 30 to dip the films into the fixer solution in that tank. When timer arm 66 leaves the segment 72, whose length is made such as to give the films the required fixing time, the circuit to the solenoids is interrupted and the film rack rises to terminate the fixing step.

Further motion of arm 66 onto segment 74 of the timer completes a circuit through switch blade 94 of switch 42 (now of course in un-operated position) to the upper fixed contact of that switch and thence to the L winding of the motor 34 to drive the tank assembly leftward one step, or until cam 60 operates switch 42, to place the wash tank again beneath the film rack, which is then lowered by energization of solenoids 26 by reason of closure of switch blade 90 to its lower fixed contact. The parts remain in this condition until the timer arm 66 moves off of the segment 76, which deenergizes the solenoids, raising the film rack, and which also opens the circuit of relay R and timer motor 64, so that the machine now remains quiescent until another cycle is initiated by operation of button 78 after the film racks have been removed and reloaded with fresh undeveloped film.

In order to provide for adjustment of the development time in accordance with the temperature of the solution, a slip clutch may be connected between the shaft of timer contact arm 66 and the motor 64, and an operating or manual control knob may be connected to the arm 66 and carry a pointer cooperating with a scale S of development times. With the machine at rest, operation of the manual control knob to advance the timer arm 66 along the segment 68 will subtract a portion of the development cycle which is commenced upon the next operation of button 78.

Many changes and modifications may be made in the apparatus as disclosed herein, without departing from the spirit of our invention as defined in the appended claims.

We claim:

1. A photographic fluid treating apparatus comprising a plurality of fluid containing tanks including a central tank, all arranged side by side one another and movable as a unit back and forth between predetermined limits along a fixed path, a photographic film-supporting rack arranged for movement along a path perpendicular to the first path, reversible motor means for reciprocating said tanks between said limits, and control means for periodically energizing said motor means to move said tanks stepwise with respect to said rack and means for moving said rack intermittently to position films supported thereby within said tanks in a predetermined sequence, whereby once during each excursion of said tanks between said limits said central tank is disposed beneath said rack.

2. A photographic fluid treating apparatus comprising a container, a housing extending upwardly from the central portion of said container, a plurality of solution tanks mounted within said container for rectilinear movement, as a unit, lengthwise thereof to place a selected one of said tanks beneath said housing, a film supporting rack arranged for vertical reciprocation into and downwardly out of said housing whereby to dip films or plates carried thereby into a selected tank, reversible power operated driving elements for automatically moving said tanks intermittently back and forth in a predetermined sequence to position the same selectively beneath said housing, and control means for maintaining said rack in elevated position during movement of said tanks and for lowering said rack into each tank, in a predetermined sequence, during periods when said tanks are stationary.

CYRUS KATZEN.
THOMAS R. GAMES.

REFERENCES CITED

The following references are of record in the file of this patent:

UNITED STATES PATENTS

| Number | Name | Date |
|---|---|---|
| 432,903 | Sacco | July 22, 1890 |
| 750,665 | Lesperance | Jan. 26, 1904 |
| 1,653,408 | Olsen | Dec. 20, 1927 |
| 1,825,709 | Bacino | Oct. 6, 1931 |
| 2,183,742 | Hershberg | Dec. 19, 1942 |
| 2,380,378 | Allen | July 31, 1945 |

FOREIGN PATENTS

| Number | Country | Date |
|---|---|---|
| 469,380 | France | May 19, 1914 |
| 25,171 | Norway | Oct. 26, 1914 |
| 592,976 | Germany | Feb. 19, 1934 |